United States Patent [19]

McGettigan

[11] 3,847,426
[45] Nov. 12, 1974

[54] FRANGIBLE BUFFER APPARATUS FOR VEHICLES

[76] Inventor: Frank J. McGettigan, 426 Kathmere Rd., Havertown, Pa. 19083

[22] Filed: Sept. 17, 1971

[21] Appl. No.: 181,317

[52] U.S. Cl............... 293/1, 188/1 C, 206/46 FR, 213/1 A, 213/221, 267/139, 267/162, 293/89
[51] Int. Cl...... B60r 19/02, B61g 11/16, F16f 7/12
[58] Field of Search............ 188/1 C; 213/1 A, 221; 293/1, 19, 71 P, 89; 206/46 FR

[56] References Cited
UNITED STATES PATENTS

| | | | |
|---|---|---|---|
| 2,251,347 | 8/1941 | Williams et al. | 213/221 |
| 2,728,479 | 12/1955 | Wheeler | 206/46 FR X |
| 2,947,459 | 8/1960 | Pregent | 206/46 FR X |
| 2,997,325 | 8/1961 | Peterson | 293/1 |
| 3,265,163 | 8/1966 | Gilbert et al. | 188/1 C |
| 3,512,822 | 5/1970 | Rich et al. | 293/1 |
| 3,603,633 | 9/1971 | Eshelman | 293/71 P X |
| 3,759,351 | 9/1973 | Purple | 293/89 X |

FOREIGN PATENTS OR APPLICATIONS

| | | | |
|---|---|---|---|
| 18,213 | 9/1912 | Great Britain | 293/1 |
| 1,923,305 | 10/1970 | Germany | 293/1 |

*Primary Examiner*—M. Henson Wood, Jr.
*Assistant Examiner*—Howard Beltran
*Attorney, Agent, or Firm*—Smith, Harding, Earley & Follmer

[57] ABSTRACT

An impact absorbing bumper apparatus for motor vehicles in which the bumper is supported on telescoping legs extending from the vehicle, the legs retracting in response to the application of an impact load to the bumper. The retracting movement of the legs is resisted by an energy absorbing means comprising a replaceable cartridge made of a crushable material. A shiftable plate assembly is positioned in the legs. After impact forces have crushed the cartridge, the legs are disassembled to provide access to the shiftable plate assembly for removal of the crushed cartridge and replacement with a new cartridge.

8 Claims, 3 Drawing Figures

PATENTED NOV 12 1974

3,847,426

INVENTOR
FRANK J. McGETTIGAN

BY Smith Harding
Earley & Follmer
ATTORNEYS

FRANGIBLE BUFFER APPARATUS FOR VEHICLES

BACKGROUND OF THE INVENTION

This invention relates generally to an impact absorbing bumper apparatus for vehicles such as automobiles or the like. One of the problems in the construction of present day automobiles is that the bumpers are incapable of withstanding even minor collisions without the occurence of substantial damage to the automobile requiring expensive repairs. Accordingly, there is a great need for bumpers which can receive a collision impact and minimize the damage to the various parts of the automobile requiring repair.

SUMMARY OF THE INVENTION

It is the general object of this invention to provide a bumper apparatus for vehicles, such as automobiles, which is capable of absorbing the impact produced on the bumpers by collisions with the effect that damage to parts of the automobile is substantially minimized and to achieve this result at a minimum of cost.

Briefly stated, the objects of the invention are achieved by providing a bumper apparatus which includes a pair of telescoping members, one of which is connected to the bumper and the other of which is secured to the vehicle, and an energy-absorbing means, in the form of a cartridge comprising a crushable material, which cartridge is arranged to resist the inward movement of the bumper connected member relative to the other member in response to the application of an impact load on the bumper.

DESCRIPTION OF THE PREFERRED EMBODIMENT

Figure 2:
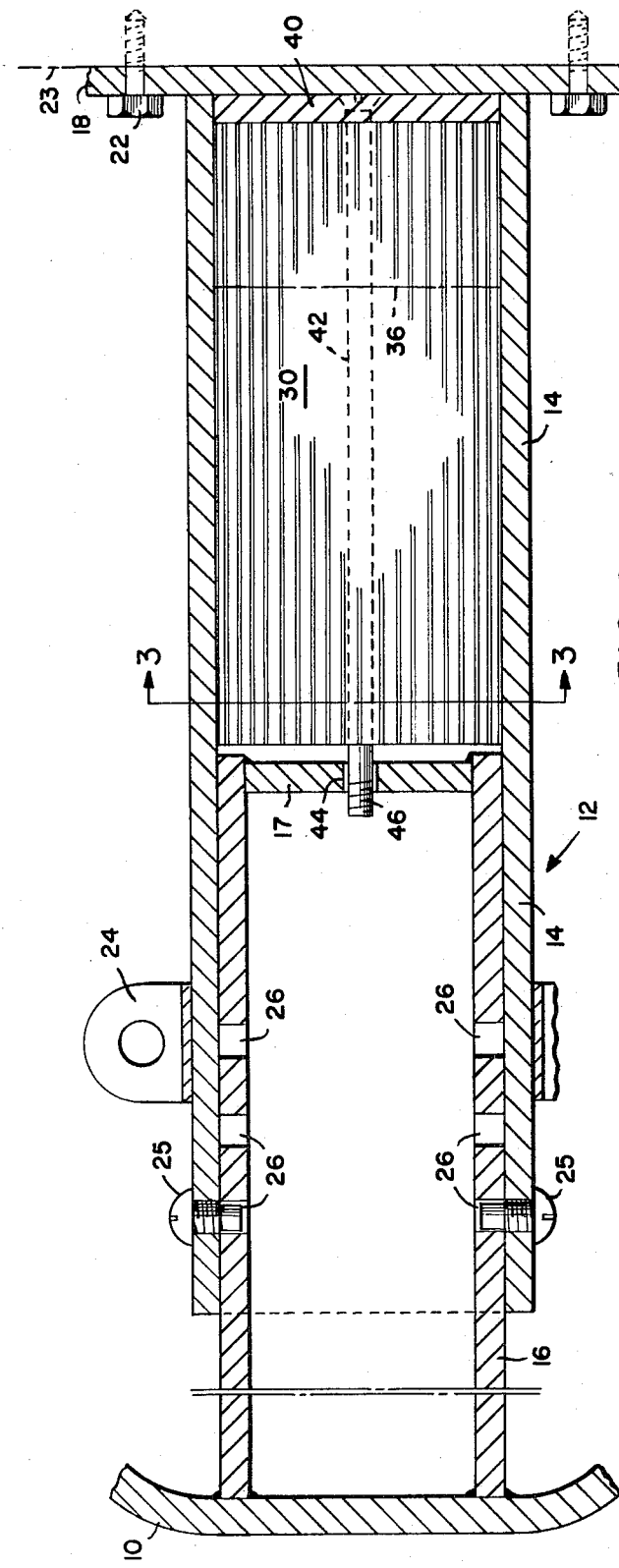
FIG. 2 is a sectional view of the bumper apparatus in accordance with the invention.

The bumper apparatus in accordance with the invention comprises a bumper 10, and two bumper supporting units 12 of similar construction, each of which comprises a pair of tubular members 14 and 16 telescopically mounted together with member 16 movably supported within member 14 as is best shown in FIG. 2. The outer member 14 is secured at one end, as by welding, to a mounting plate 18 which is mounted on the front end of a vehicle 20, such as an automobile, by means of mounting bolts 22 which engage the frame 23 of the vehicle. Also, support members or bands 24 attach the other ends of tubular members 16 to frame 23. The member 16 has its extended end connected, as by welding, to the bumper 10 and its inner end closed off with an impact plate 17 for a purpose to be described more fully hereafter. The members 14 and 16 are held in a desired position by means of a pair of shear screws 25 which are threadedly secured in member 14 and extend into holes 26 in inner member 16. There are provided two additional pairs of holes 26 spaced axially along member 16 to provide alternative mounting positions for the members 14 and 16. The shear screws 24 serve to position member 16 relative to member 14 under normal conditions but, as will be described more fully hereafter, will be sheared upon the application of an impact load to the bumper 10 permitting the member 16 to move relative to the member 14.

Figure 1:
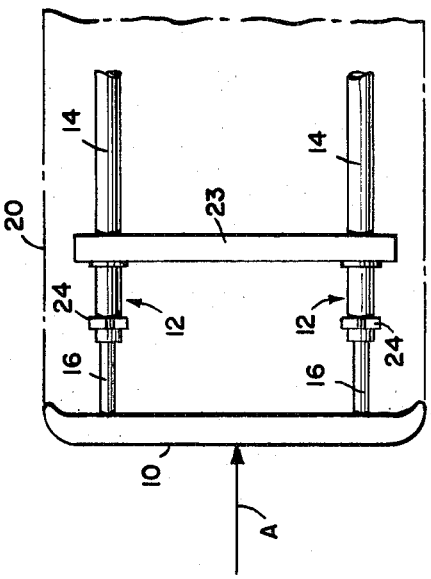
FIG. 1 is a plan view of the bumper apparatus in accordance with the invention as mounted on an automobile.

Energy-absorbing means are provided for resisting inward or retracting movement of member 16 relative to member 14 in response to the application of an impact load on the bumper 10 in a direction to move the bumper 10 toward the vehicle 20 such direction being indicated by arrow "A" in FIG. 1. This energy-absorbing means comprises a cylindrical cartridge 30 contained within tubular member 14 inwardly of the impact plate 17 at the end of telescoping member 16. The cartridge 30 is designed to substantially fill this space so as to resist the inward movement of member 16.

Figure 3:
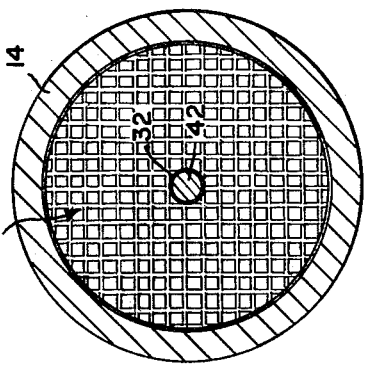
FIG. 3 is a sectional view on lines 3—3 of FIG. 2.

The cartridge 30 is made of what may be termed a non-resilient "crushable" material, this term being used herein as meaning a material which will reduce permanently in volume in response to the application of a load thereto throughout a substantial area of its surface, and which will not rebound because of the non-resiliency of the material selected. Illustrative examples of satisfactory non-resilient crushable materials are lead or resin-impregnated cardboard formed in a grid-like, a honeycomb or other cellular configuration. In FIGS. 2 and 3 there is shown a crushable cartridge 30 made of a grid-like construction. It will be apparent that the cartridge 30 is thus crushable from an initial volume to a reduced volume since the material forming the grid arrangement can be collapsed to a smaller volume by filling in the grid cavities or cells.

The cartridge 30 is designed to be replaceable and to this end, there is provided means for removing the cartridge after it has been crushed. It will be apparent that a crushed cartridge can be rather firmly embedded in the tubular member 14. The cartridge removing means comprises a plate 40 movably contained within tubular member 14 and located between the inner end of cartridge 30 and the mounting plate 18. A rod 42 is secured at one end, as by welding, to the plate 40 and extends axially therefrom through a central bore 32 in the cartridge 30 and through an opening 44 in the impact plate 17 to terminate at a threaded end 46. It will thus be apparent that a cartridge 30 can be removed from member 16 by engaging the end 46 of rod 42 and pulling the same outwardly, this outward movement serving to extract the cartridge 30 by engagement of the remover plate 40 with the cartridge 30.

In the operation of the bumper apparatus in accordance with the invention, the application of an impact load to the bumper 10, as indicated by arrow A, will initially be resisted by the shear screws 24. However, if the impact load is sufficient, such as in the case of a collision, the screws 25 will shear allowing the bumper units 12 and the bumper 10 to move inwardly toward the frame 23 of the vehicle. This inward movement will be resisted by the cartridge 30 of each unit 12 which are crushed by the pressure applied by the associated impact plates 17 of the movable members 16. In effect, the cartridges 30 serve to absorb the energy produced by the impact load. It will be apparent that the impact energy is absorbed by the crushing action of the cartridge 30 which involves the deformation of the grid-like structure from the enlarged condition to a condition of reduced volume. This involves the permanent reduction in the size of the many cavities within the cartridge as the cartridge is reduced in volume. The crushed condition of the cartridge is shown in FIG. 2 where the outboard end of the cartridge is shown in dashed lines at 36. Typically, this would represent a reduction in length from about six to about two inches.

After impact, the bumper assembly, including bumper 10 and movable tubular members 16, is slipped off the tubular members 14. This makes the cartridge removing means accessible and a threaded handle is engaged with the threaded end 46 so that the rod 42 and the connected remover plate 40 may be readily pulled from the tubular member 14. During this removing movement, the plate 40 engages the crushed cartridge 30 to extract the same from the tubular member 14. A new cartridge 30 and the removing means are then reinserted into the tubular member 14 and the apparatus is reassembled as is shown in FIG. 2 with new shear screws 25 being installed.

The bumper apparatus made in accordance with this invention is adapted for mounting on the front and rear of an automotive vehicle.

It will be apparent that various changes may be made in the construction and arrangement of parts without departing from the scope of the invention as defined by the subjoined claims.

I claim:

1. A bumper apparatus for motor vehicles such as automobiles or the like comprising a bumper, a pair of elongated telescoping members, at least one of said members being tubular and being open at one end and one of said members being connected to said bumper, means for securing the other of said members to the vehicle to extend generally horizontally from the vehicle frame, energy absorbing means arranged to resist the inward movement of said one member relative to said other member in response to the application of an impact load to said bumper, said energy-absorbing means including a crushable cartridge which is reduced in volume in response to said relative movement of said members, means associated with said non-tubular member for delivering said impact load to said cartridge, said cartridge being insertable into and removable from the interior of said tubular member through said open end, and cartridge removing means within said tubular member at the time of application of said impact load for engaging said cartridge to forcefully remove the same from said tubular member when said cartridge removing means is withdrawn from said tubular member.

2. A bumper apparatus according to claim 1 including shearable means for holding said members in a predetermined position prior to the application of an impact load to said bumper.

3. A bumper apparatus according to claim 1 wherein said crushable cartridge is comprised of a cellular configuration, the cavities of which are permenently reduced in size when the cartridge is crushed to a reduced volume.

4. A bumper apparatus according to claim 1 wherein said means for removing said cartridge from said tubular member containing said cartridge includes a plate located at the internal end of said cartridge and a rod extending from said plate through said cartridge for access from the exterior of said tubular member containing said cartridge.

5. A bumper apparatus according to claim 4 including shearable means for holding said members in a predetermined position prior to the application of an impact load to said bumper.

6. A bumper apparatus according to claim 4 including shearable means for holding said members in a predetermined position prior to the application of an impact load to said bumper, said shearable means including at least one shear screw engaging each of said members.

7. A bumper apparatus according to claim 4 wherein said crushable cartridge is comprised of a cellular configuration, the cavities of which are permenently reduced in size when the cartridge is crushed to a reduced volume.

8. A bumper apparatus according to claim 1 wherein said crushable cartridge is comprised of a non-resilient cellular configuration, the cavities of which are reduced in size when the cartridge is crushed to a reduced volume.

* * * * *